United States Patent [19]

Brandkamp et al.

[11] Patent Number: 5,153,745
[45] Date of Patent: Oct. 6, 1992

[54] METHOD AND APPARATUS FOR COMPENSATING FOR ILLUMINATION VARIATIONS OF A LAMP IN A DOCUMENT SCANNING SYSTEM FOLLOWING EXTENDED LAMP INACTIVITY

[75] Inventors: Warren F. Brandkamp; William A. Blitz, both of Webster; Gerald L. Coy, Rochester, all of N.Y.

[73] Assignee: Xerox Corporation, Stamford, Conn.

[21] Appl. No.: 590,426

[22] Filed: Sep. 28, 1990

[51] Int. Cl.⁵ .................... H04N 1/40; G03B 27/54; G03B 27/72
[52] U.S. Cl. ................... 358/406; 355/203; 355/228; 355/208; 340/516; 358/475
[58] Field of Search .............. 358/406, 475, 480, 461; 340/516, 641; 355/203, 228, 69, 204, 207, 209, 208, 83, 30, 67, 69; 364/550, 551.02, 552, 571.01; 315/307

[56] References Cited

U.S. PATENT DOCUMENTS

| | | | |
|---|---|---|---|
| 3,672,759 | 6/1972 | Bauer | 355/203 |
| 3,679,306 | 7/1972 | Dubois et al. | 355/203 |
| 4,183,657 | 1/1980 | Ernst et al. | 355/208 |
| 4,312,589 | 1/1982 | Brannan et al. | 355/208 |
| 4,372,672 | 2/1983 | Pries | 355/208 |
| 4,460,270 | 7/1984 | Watai et al. | 355/208 |
| 4,508,446 | 4/1985 | Imai | 355/208 |
| 4,512,652 | 4/1985 | Buck et al. | 355/208 |
| 4,540,270 | 9/1985 | Imanaka et al. | 355/210 |
| 4,711,569 | 12/1987 | Nishimori et al. | 355/69 |
| 4,739,367 | 4/1988 | Watanabe et al. | 355/204 |
| 4,903,141 | 2/1990 | Morton et al. | 358/448 |
| 4,987,444 | 1/1991 | Nanri | 355/69 |

FOREIGN PATENT DOCUMENTS

| | | | |
|---|---|---|---|
| 0065660 | 4/1985 | Japan | 358/475 |
| 0040864 | 2/1989 | Japan | 355/69 |

OTHER PUBLICATIONS

Keillor et al. "Optical Scanner Maintenance . . ." IBM Tech. Discl. Bull. vol. 19 No. 1 Jun. 1976.

Primary Examiner—Edward L. Coles, Sr.
Assistant Examiner—Jill Jackson

[57] ABSTRACT

An illumination output from a fluorescent lamp used in a RIS type scanner is maintained at optimum by monitoring the lamp's on/off state and turning the lamp on for a time period following a specified cumulative off time. In one example, the lamp is turned on for a two minute interval following a one hour off time. Following the two minute on period, a diagnostic test is automatically performed to determine whether variations in the lamp output have resulted in an out of specification condition requiring that the lamp be recalibrated to the photosensor array. The calibration is automatically enabled by adjusting the gain of the photosensor array until the photosensor response is within the nominal percentage range. The scanner is then returned to a standby mode. All of the tests are performed automatically and normal operations can be accomplished while the lamp is in warm up phase.

9 Claims, 5 Drawing Sheets

METHOD AND APPARATUS FOR COMPENSATING FOR ILLUMINATION VARIATIONS OF A LAMP IN A DOCUMENT SCANNING SYSTEM FOLLOWING EXTENDED LAMP INACTIVITY

BACKGROUND AND MATERIAL DISCLOSURE STATEMENT

This invention relates to an illumination system for a document scanning system and, more particularly, to a fluorescent lamp and an associated control system to maintain the illumination profile at preset optimum operational conditions.

Low pressure, mercury vapor fluorescent lamps are used in a variety of lighting applications. Of particular interest, for purposes of the present invention, is the widespread use of fluorescent lamps to illuminate documents being copied by an electrophotographic reproduction machine.

In a conventional mercury fluorescent lamp, an electrical discharge is generated in a mixture of mercury vapor, at low pressure, and a fill gas. The light output from the lamp depends on a number of variables, the most important of which is the mercury vapor pressure inside the lamp tube, and the corresponding cold spot temperature. Prior art techniques for maintaining the mercury vapor pressure at some optimum value are well known in the art, and typically require a temperature-sensitive device such as a thermocouple, thermistor or thermostat to monitor the temperature of the cold spot. A feedback circuit provides closed loop control of a temperature-regulating device to maintain the optimum mercury pressure.

Thus, in a conventional type copier, and under normal operating conditions, it is known how to stabilize a fluorescent lamp output to provide the desired lamp illumination profile at the surface of the photosensitive image plane. However, it has been found that there are some operating conditions which cause transient illumination variations along the lamp axis. These variations create a non-uniform output along the length of the lamp resulting in a non-uniform exposure level at the photosensitive image plane of the reproduction machine resulting in defects in output prints which are derived from developing the exposed latent image. These operating conditions, and their negative impact on lamp operation, are as as follows:

1. When the particular machine in which the lamp is used is in an extended standby period, it has been found that the lamp output varies (drifts) from on optimum profile for the first minute or two of operation following the extended standby period. Any exposure cycle accomplished during this initial start-up time may experience the undesirable axial illumination variation.

2. At initial installation and at lamp replacement, there may be a break-in period lasting from a few days to a week during which the mercury migrates along the lamp until it settles into a relatively stable distribution along, and to some extent within, the fluorescent coating the walls of the lamp. This instability results in the axial illumination variation described above.

3. Installation and usage of equipment in conditions where the ambient temperature is extremely cold, or varies thermally over a wide range can have a negative impact on the lamp temperature stabilization resulting in changes in the lamp illumination profile.

According to a first aspect of the invention, there is provided an apparatus and process in a document and scanning system, for automatically detecting a system standby period of some predetermined duration (for the example given, one hour) and for automatically turning the fluorescent lamp on to full power for approximately two minutes. This periodic lamp energization reduces the undesirable axial illumination variations described in the above situation. According to a second aspect of the present invention the lamp specifications are automatically checked at the end of the 2 minute on interval and, if found to be out of specification, the electronic gain applied to each pixel of a photosensor utilized in the scanning system is automatically readjusted to compensate to the corresponding illumination changes in the lamp. According to a still further aspect of the invention, the machine is available for use in a copying operation during the automatic warmup and calibration/recalibration check process.

The following patents have been identified in a prior art search:

U.S. Pat. No. 3,672,759 to Bauer discloses an illumination control system which compensates for gradual dimming or deterioration of exposure lamps in a photocopying machine. An accumulator keeps a count of all reproductions which is used to control a variable current generator which in turn controls illumination levels. See column 5, line 53 to column 6, line 49.

U.S. Pat. No. 3,679,306 to Du Bois et al. discloses a feedback system for controlling light level in an electrostatic photocopier. A sensor is used to detect illumination and serves as a source of a feedback signal which can compensate for variations in light energy due to lamp aging, dirty optics, etc.

U.S. Pat. No. 4,512,652 to Buck et. al., assigned to Xerox Corporation, discloses a control scheme for changing characteristics of a photoconductive member used in a printing machine. A controller determines charging current used for a photoconductive member by entering a scale factor based on the rest time between copy cycles into a controlling algorithm.

U.S. Pat. No. 4,540,270 to Imanaka et al. discloses an electrophotographic copying machine which has a timing means which is operated upon the completion of a copying operation for counting a time during which a pre-copy process is started to stabilize the property of a photoreceptor.

U.S. Pat. No. 4,739,367 to Watanabe et al. discloses an image forming apparatus having a control means for effecting control of a preliminary processing of image formation. A timer is provided for timing the period of time passed since an image transfer occurred. A control means effects the agitation of a developing means based on the time period.

U.S. Pat. No. 4,508,446 to Imai discloses a reproduction process control method for a copier which maintains the quality of copy images uniform even during temperature changes. Various combinations of variables including charging amount, exposure time, and bias voltage are changed depending upon photosensitive member temperature as compared with a reference level to maintain the quality.

U.S. Pat. No. 4,183,657 to Ernst et al. discloses a system for checking the copy quality within an image area of an electrophotographic machine. During a test cycle, variables such as toner concentration, image voltage and low reflectance are checked. The checks may be done during a shutdown cycle or during small production runs.

U.S. Pat. No. 4,372,672 to Pries discloses a self-triggering quality control sensor which can work with a system as in the '657 patent. A photosensor senses an untoned reflectance and stores a signal in a sample circuit. The circuit triggers itself when a transducer produced signal varies from a sample area which negates the need for testing to be controlled by the copy machine.

And, more particularly, the invention relates to a method for compensating for illumination variations along the length of a linear illumination lamp utilized in a document scanning system including the steps of:

(a) determining that the lamp current has been off for a cumulative time period exceeding a preset value $T_1$.

(b) energizing the lamp and maintaining the lamp in on condition for a period of time $T_2$ and, (c) initiating a diagnostic routine following said time period $T_2$ to determine whether the lamp output has varied sufficiently from predetermined specifications to require compensation.

IN THE DRAWINGS

DESCRIPTION OF THE INVENTION

Figure 1:
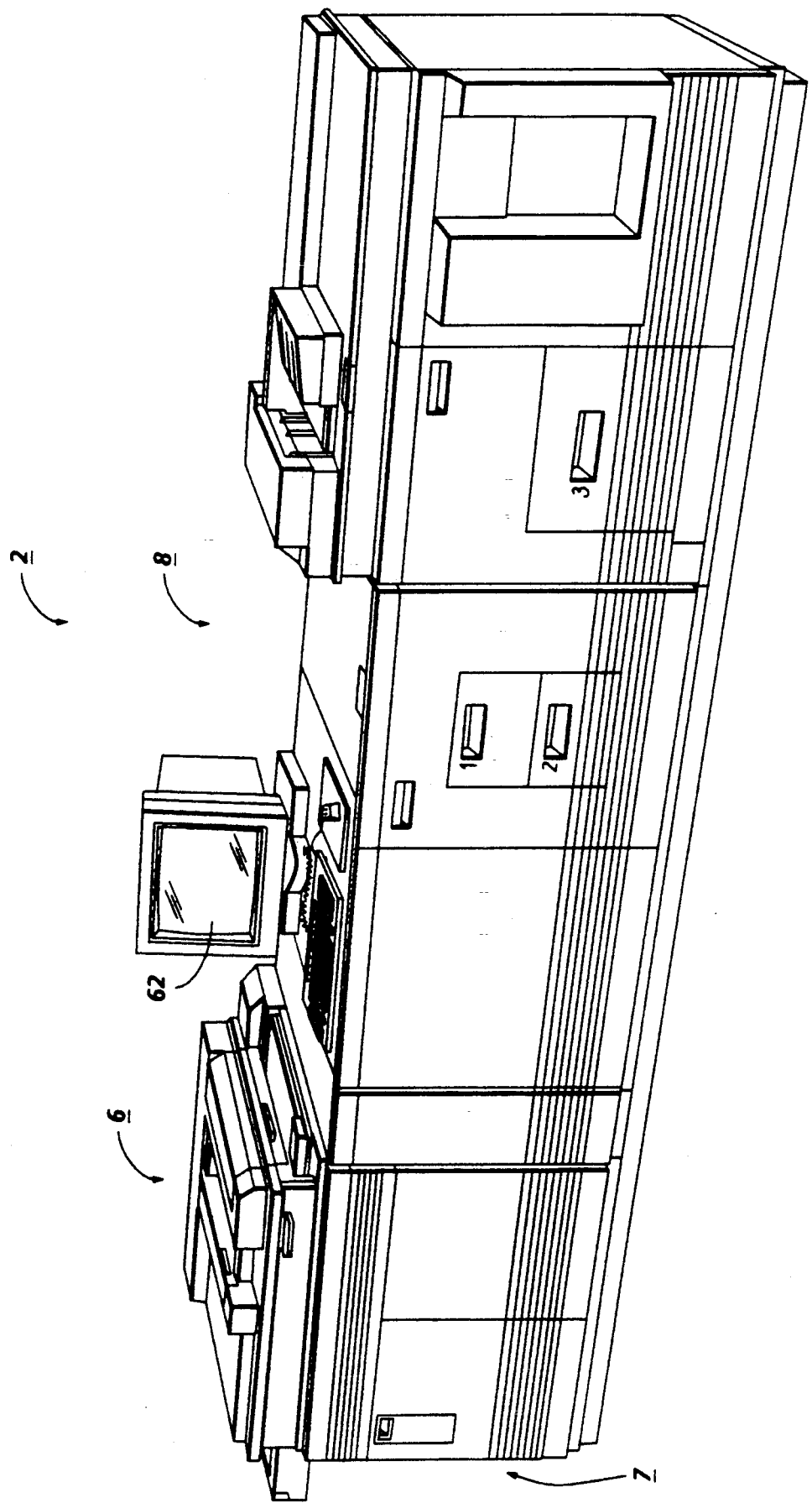
FIG. 1 is a view depicting an electronic printing system incorporating the document illumination and control system of the present invention.
Figure 2:
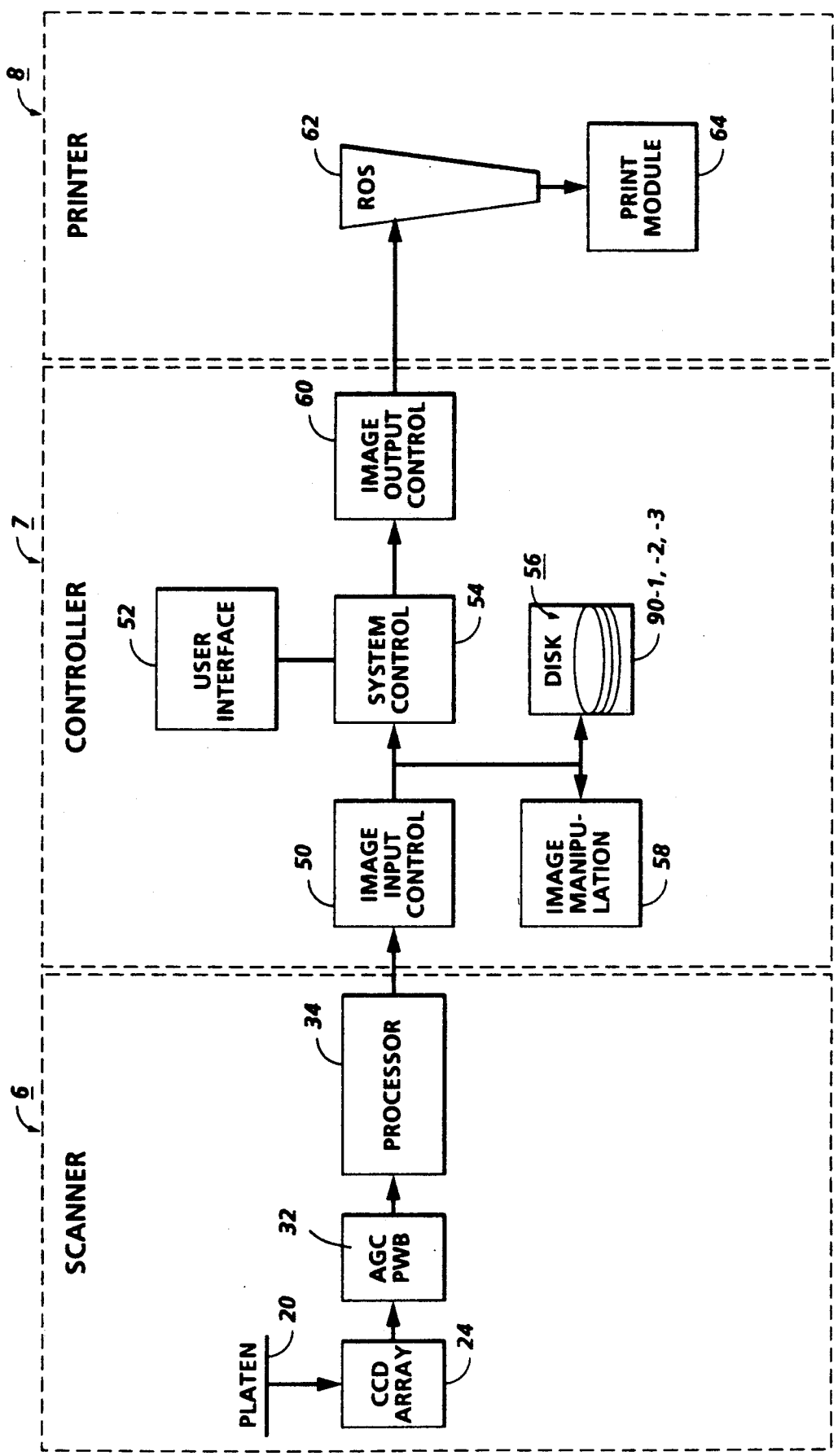
FIG. 2 is a block diagram depicting the major elements of the printing systems shown in FIG. 1.

Referring to FIGS. 1 and 2, there is shown an exemplary laser based printing system 2 divided into a scanner section 6, controller section 7, and printer section 8. The document illumination control and calibration circuits to be discussed below are associated with scanner section 6 and controller section 7. While a specific printing system is shown and described, the present invention may be used with other types of printing systems such as light lens copying onto a photoreceptor, ink jet, ionographic, etc.

Figure 3:
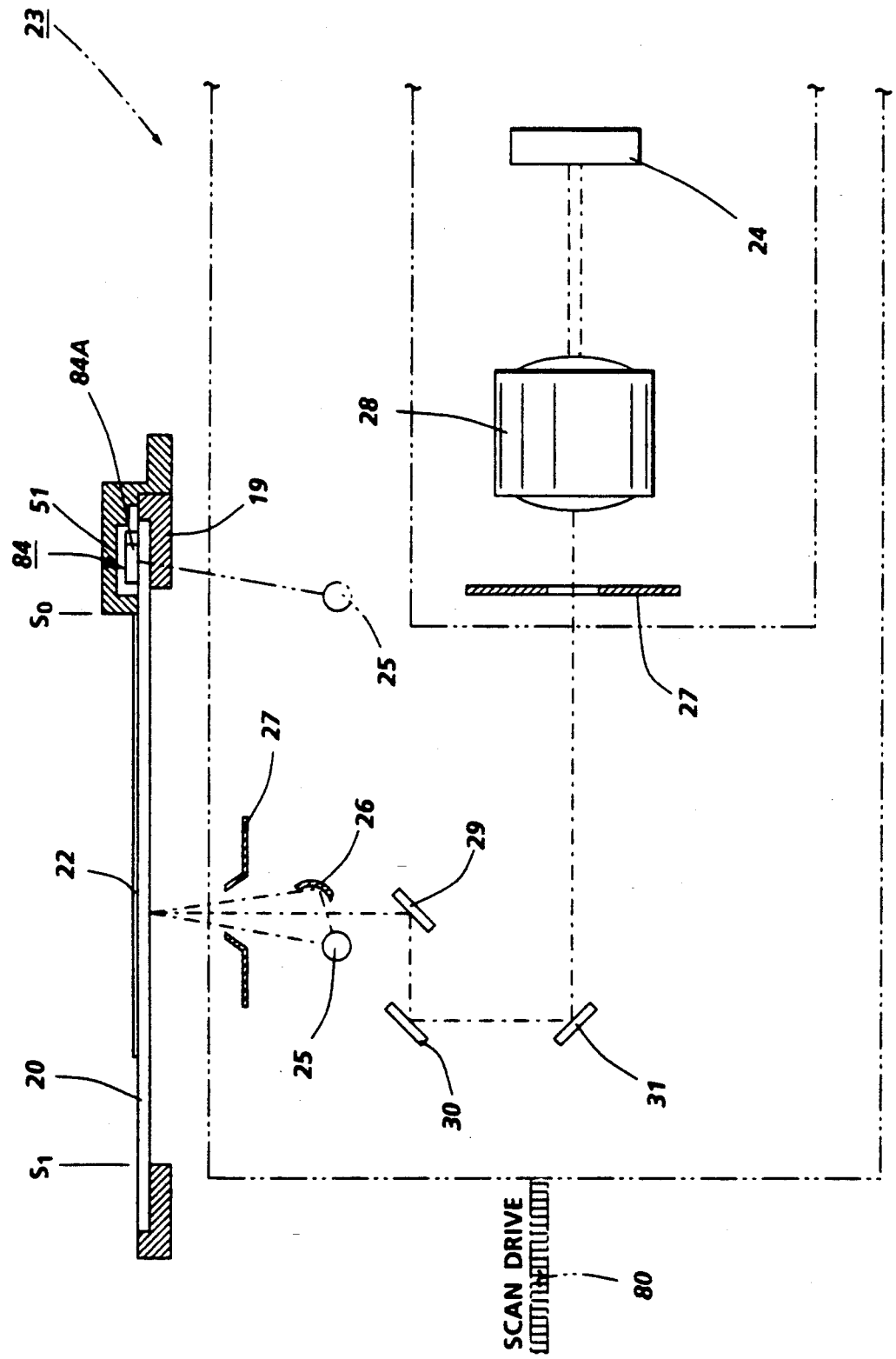
FIG. 3 is an enlarged schematic view of the document scanner for the printing system shown in FIG. 1, including a fluorescent lamp document illumination.

Referring particularly to FIGS. 2 and 3, scanner section 6 incorporates a transparent platen 20 on which a document 22 to be copied is located. One or more linear photosensor arrays 24 are supported for reciprocating scanning movement below platen 20. An optical assembly 23 comprises a plurality of optical components which move together as a single unit. The components include a geometrically linear, fluorescent lamp 25, associated reflector 26, and baffle 27, the latter two elements cooperating to direct a narrow band of light onto an incremental area of the platen. Also included in assembly 23 are a lens 28, and mirrors 29, 30, and 31, which cooperate to focus the illuminated line-like segment of platen 20 and the document being scanned thereon, onto array 24. Sagital stop 27 functions to produce a more uniformly illuminated image by vignetting the light entering the lens most strongly on the optical center line and gradually tapering off at larger field anlges. This results in a relatively constant image illumination as a function of field angle. Array 24 produces image signals or pixels representative of the image scanned which, after suitable processing by processor 34, are output to controller section 7. The document is registered against the edges of a registration guide 51, and scanning takes place from start of scan position $S_0$ to end of scan position $S_1$.

Figure 4:
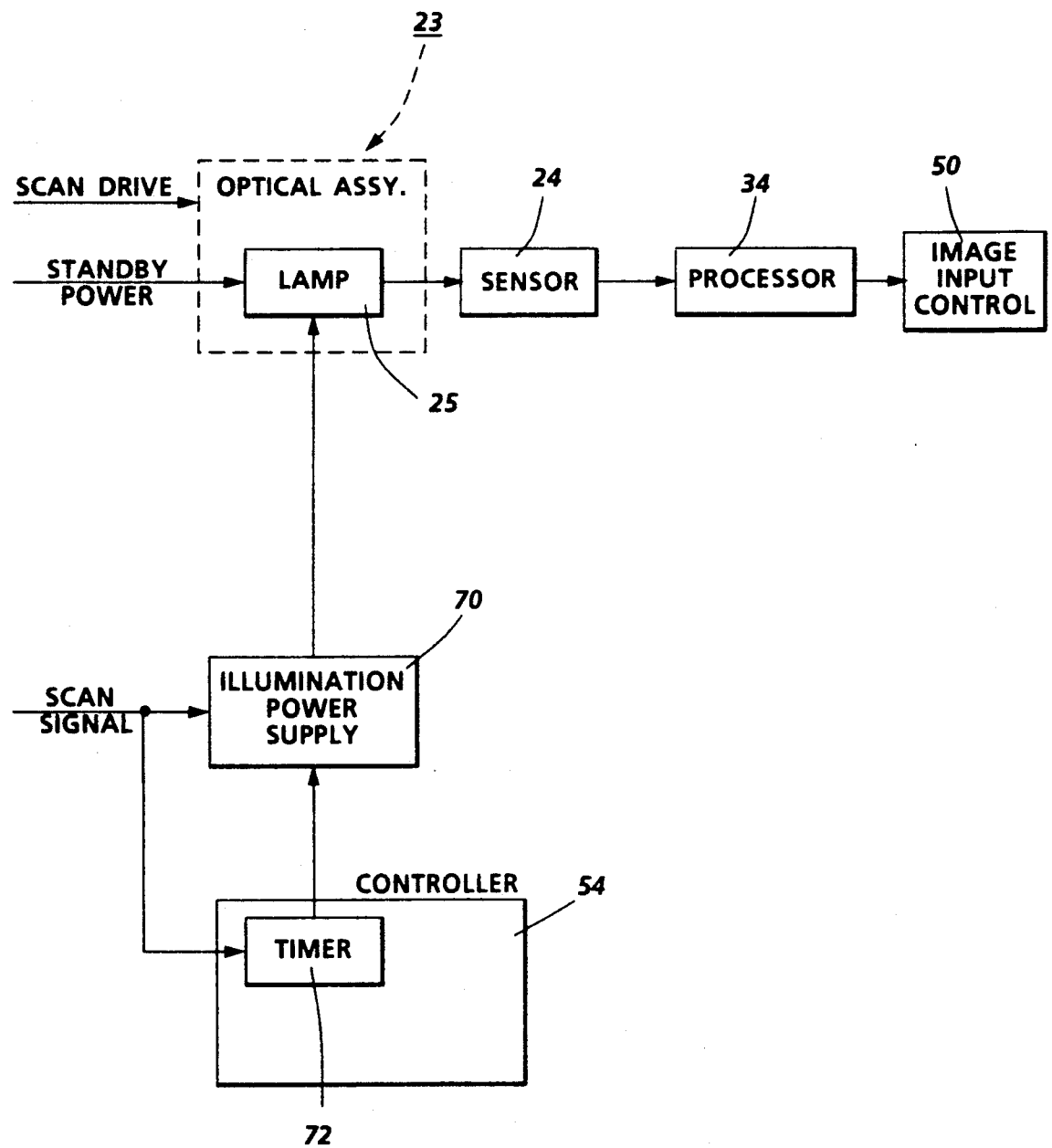
FIG. 4 is a schematic block diagram of the circuits controlling the testing of the lamp in a standby mode.
Figure 5:
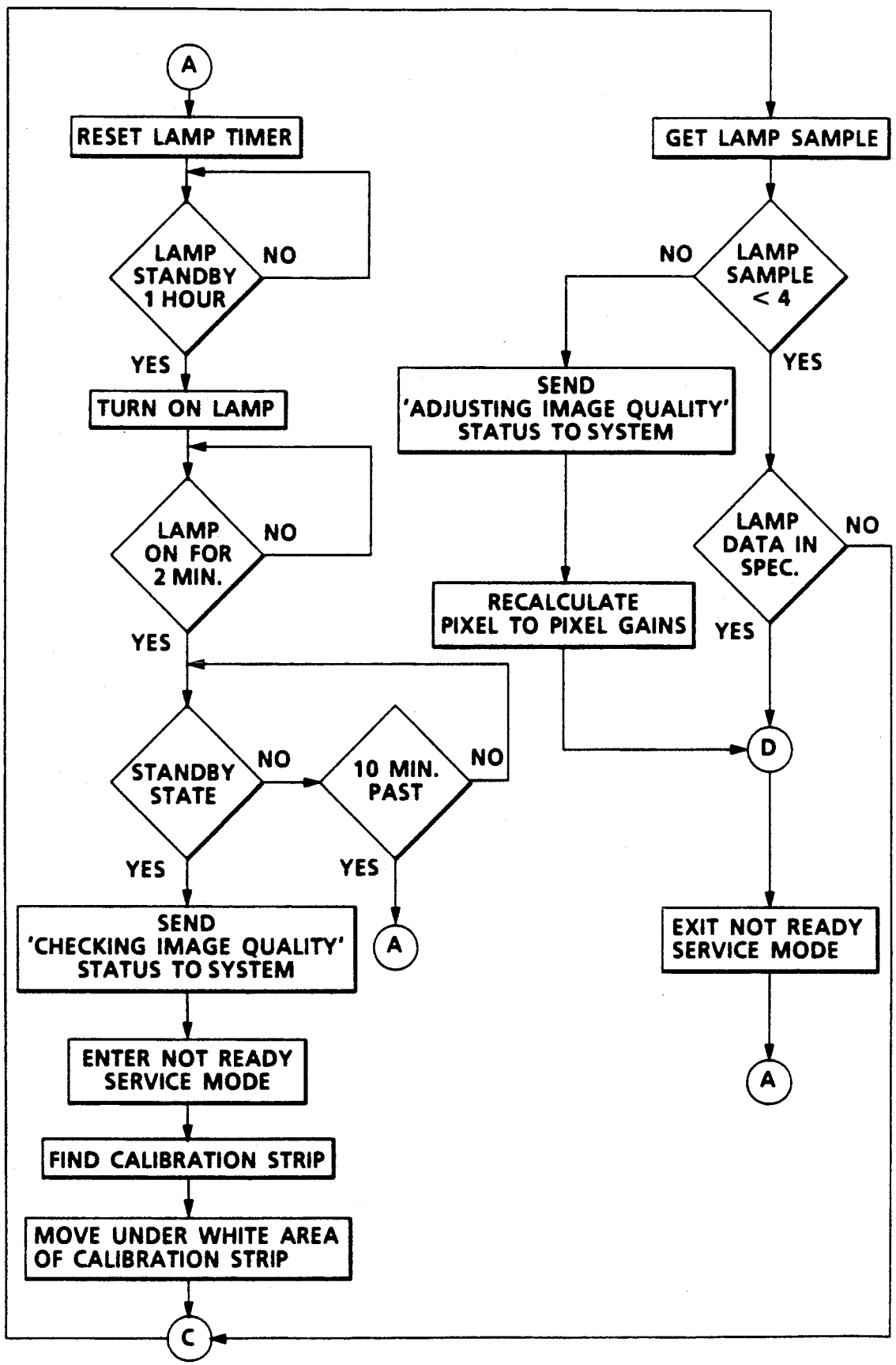
FIG. 5 is a flow chart of the lamp stability check and recalibration.

A gain adjustment is applied to the overall output analog signal level from array 24 and AGC circuit 32 and sent to processor 34. This gain is updated on a scan line by scan line basis based on sensed changes in the overall lamp output as detected on an AGC patch which is mounted on assembly 23 outside of the active imaging scan area. Processor 34 converts the input analog signals to digital signals and processes the digital image signals as required to enable system 2 to store and handle the image data in the form required to carry out the job programmed. Processor 34 also provides enhancements and changes to the image signals such as filtering, thresholding, screening, cropping, scaling, etc. Referring to FIG. 2, controller section 7 is, for explanation purposes, divided into an image input controller 50, User interface (UI) 52, system controller 54, main memory 56, image manipulation section 58, and image output controller 60. The scanned image data input from processor 34 of scanner section 6 is operated on by controller section 7. The output of controller 7 operates a Raster Output Scanner (ROS) 62 in printer section 8. ROS 62 incorporates a laser which generates output beams which are in turn scanned across a moving photoreceptor located in print module 64. Image lines are exposed at the photoreceptor with each scan cycle to create latent electrostatographic images. A further description of the exemplary printing system 2 is found in co-pending U.S. application Ser. No. D/89289 whose contents are hereby incorporated by reference As described above, lamp 25 is subject to instabilities associated with periods of inactivity, temperature variations or following lamp replacement. According to a first aspect of the present invention, a lamp energization and diagnostic test routine is periodically enabled to maintain the lamp in a warmed-up condition and within specification. As shown in FIG. 4, lamp 25 has two inputs, one the filament standby power, and the second the full power input from illumination power supply 70 coupled across the lamp to provide the lamp current during the lamp on time. The illumination power supply is activated and the lamp turned on under two conditions. The first condition is during a normal scan mode which is selected when a document is to be copied. In this mode, and referring to FIG. 3, a scan signal is received from the system control panel, and a scan drive mechanism 80 is activated to move the scanning components in a right to left or left to right scan motion. The lamp scans across the bottom of the platen from right to left, left to right, the reflected light from the document on the platen glass being imaged by lens 28 to form an electronic image at the document sensor array 24. When the scan/copy mode is concluded, the on power input is removed from lamp 25, and only the standby (filament) power is left on. When a lamp is turned off, a signal is sent to timer 72 located in system control 54 activating the timer circuit. Referring also to the flow chart shown in FIG. 5, the timer circuit is set to generate an output signal when the cumulative off time of the lamp exceeds some predetermined time period. A period of one hour has been selected for this example. For example, the lamp may be turned off and stay off for a 10 minute interval at which time a scanning mode may be selected by an operator. The lamp is turned on and stays on while performing the scanning function. The timer circuit is inactivated for the scanning time, but is fully enabled following lamp turn off again. This sequence may occur one or more times, but it is the cumulative off time which is monitored.

When a cumulative off time of one hour has been detected, the timer circuit 72 generates an output signal to power supply 70 causing full power to be applied to lamp 25. The timer output is a continuous signal which maintains power to the lamp for a two minute period. During the two minute period, the machine remains available for use and a scanning mode can be initiated. Any scanning job which is still running at the end of the two minutes will run to completion.

At the beginning of the two minute warm up period, a scan drive signal is sent to optical assembly 23 from system controller causing the assembly to move to the right beneath the white calibration strip 84 located under the the registration guide 51 (FIG. 3) so that the lamp is out of direct line of view of an operator. According to a second aspect of the invention, the lamp is checked to ensure that the lamp profile is still within initial specifications.

The lamp will remain at this position (under the registration guide) for the two-minute warm up period unless a scan mode is initiated. If this occurs, the lamp assembly will be moved to the start of scan position, $S_0$ and operate thereafter in the normal scan mode. Following the two minute on time, a check is made to see whether the lamp assembly is in a standby state or is in a scanning cycle. If no scanning job is in progress, the image quality of the lamp is reviewed by a diagnostic routine described below. If a scanning job is being run, a second timer in the timing circuit 72 monitors the time, and if a time greater than some predetermined time, for this example 10 minutes, is detected a malfunction is possible and the lamp timer is reset.

Assuming that the two minute warm up is complete and no scanning job is presently being run, a signal is sent to the system display (screen 62 in FIG. 1) causing a "checking image quality" signal to be displayed. This will result in a visual display notifying an operator seeking to initiate a copy cycle that a status check is being run, and that the scan system is momentarily unavailable for use. The signal will only be displayed in the event that a scan function is selected. At this time, the system enables a "not ready" service mode and the lamp assembly is moved to a status test position beneath calibration strip 84 (FIG. 3) which is mounted on the platen surface beneath the document registration edge guide 51. The drive and control means for locating the calibration strip and parking the lamp under the white portion of the strip are described in detail in copending application U.S. Ser. No. (D/90171) whose contents are hereby incorporated by reference. It is sufficient for purposes of the present invention to state that the lamp is positioned in the dotted location shown in FIG. 3 so as to illuminate the white linear section 84A of strip 84. A series of samplings of the lamp illumination output are enabled and detected across array 24. Each sample of the reflected output detected at photosensor 24 is processed by processor 34. The output of each photosite of the photosensor is compared with an algorithmically predetermined gray level response corresponding to an initial calibration level. A nominal gray level is 238; a variation of ±3% around this nominal value is accepted as being within initial calibration. Thus, if the gray level response of the array is detected to be within this percentage tolerance within three samples, the initial calibration is still valid. At this point the "not ready" service mode is terminated, the timer reset and the lamp is turned off. If the lamp still falls outside the test limits, each photosite of array 24 is recalibrated by adjusting the pixel by pixel gain correction stored in RAM memory in processor 34. It is this recalibration which provides the compensation for the lamp output variations. It is noted that the representation of the embodiment Rapid recalibration is enabled because the necessary lamp warmup has already been accomplished by virtue of the two minute energization. This lamp spot check takes place in a very short time interval (approximately 30 seconds) and, therefore, a operator seeking to enter a scan mode should be unaware that it has occurred. It is noted that the representation of the embodied algorithm for this above-described routine is set forth in Appendix A.

For some systems, a shorter routine may suffice which does not enable the specification/recalibration routine. Thus, following the two minute warm-up period, the system may simply be returned to standby.

While the invention has been described with reference to the structure disclosed, it will be appreciated that numerous changes and modifications are likely to occur to those skilled in the art. For example, for the example chosen, the one-hour duration of time $T_1$ selected for the time off duration, and the two minute warmup time $T_2$ are representative of the possible times. It will be apparent, however, that $T_2$ should be quite short relative to $T_1$, and that different values can be used other than the ones mentioned in the example. Also, while the linear illuminator for this example discloses a fluorescent lamp, other types of linear illuminator may be used for other types of scanning systems, e.g., a sodium vapor lamp may be suitable for certain types of systems. The invention, therefore, is not limited solely to monitoring and calibration of a fluorescent lamp. It is intended to cover all changes and modifications which fall within the true spirit and scope of the invention.

APPENDIX A

```
CalWait: Procedure Public;
/*----------------------------------------------------------------
------------------------------------------------------------------*/

Declare Spot   Byte;
Declare Pos    Byte;

LampSamples = 09;
```

```
If NewLineReceived
  Then Do;
    NewLineReceived = False;

Call LampProfile; /* Get a scan line of data */

LampProfile: Procedure Public;
/*-------------------------------------------------------------------------
  This is executed on VIDEO PAGE 1 RAM monitoring lamp profile stability
-----------------------------------------------------------------------*/

Declare LampPos Byte;
Declare Overall Address;

LampPos, Overall = 0;

Do Counter1 = 20H to 720H by (700H / (LampSamples - 01));
  Call PagetoVideo;
/*********************** Video RAM
******************************/
  AvgPlc = BegStorageRAM2 + Counter1;
  Call Avg64;

;Date 04 May 87
;This procedure takes the average of sixty four numbers.
;Register usage:
;HL : pointer to the pixel location
;C  : used as a loop counter
;DE : accumulates sum Avg64:  LHLD AvgPlc   ; load address first pixel location
        MOV  E,M      ; read the byte pointed to by HL, store in E
        MVI  D,00     ; clear the MSB of DE
        XRA  A        ; clear carry flag
        MVI  C,63     ; initialize the loop counter
Loop64: INX  H        ; move pointer to next address
        MOV  A,M      ; move the byte to A
        ADD  E        ; add the values together
        MOV  E,A      ; save the value in E
        JNC  Cary64   ; if the carry bit isn't set, read another byte
        INR  D        ; increment D because there was a carry
Cary64: DCR  C        ; decrement the loop count
        JNZ  Loop64   ; if it isn't zero, read another value ;Now DE contains the sum of 64 numbers. Divide it by 64.
        MVI  C,06     ; initialize the loop counter
Div64:  XRA  A        ; clear carry flag
        MOV  A,D      ; move MSB to A
        RAR           ; divide by 2 & set carry flag
        MOV  D,A      ; restore the byte
        MOV  A,E      ; move LSB to A
        RAR           ; divide by 2 & set carry flag
        MOV  E,A      ; restore the byte
        DCR  C        ; decrement the loop count
        JNZ  Div64    ; if it isn't zero, divide again
        MOV  A,E      ; restore the byte
        STA  AvgPrf   ; store the sum as AvgPrf
        RET Call PagetoCode;
/*********************** Code RAM
******************************/

LampArea(LampPos) = AvgPrf; /* Stuff Array element */
```

```
Overall = Overall + AvgPrf; /* Update running average */
LampPos = LampPos + 1;
AvgPrf = 0;
End;

RunningAvg = (Overall / LampSamples);
LampArea(LampPos) = RunningAvg;

VideoInfo = True;

End LampProfile;

If QuickCheck
    Then Do;
        Pos = 0;
        Spot = 0;

Do While Pos < LampSamples; /* 3.9 % @ nominal reflectance */
            If ((LampArea(Pos) > (IPMNVM.WhiteReflct - Deviation)) AND
              (LampArea(Pos) < (IPMNVM.WhiteReflct + Deviation)))
            Then Spot = Spot + 01;
            Pos = Pos + 01;
        End;

SampleTries = SampleTries + 01;
```

We claim:

1. A method for compensating for illumination variations along the length of a linear illumination lamp used to scan a document in a scanning mode including the steps of:
   (a) determining that a lamp current has been off for a cumulative time period exceeding a preset value $T_1$ measured from the termination of a last scanning mode,
   (b) energizing the lamp following said determination that the lamp current has been off for a time exceeding $T_1$.
   (c) maintaining the lamp in an energized condition for a period of time $T_2$ and,
   (d) initiating a diagnostic routine following said time period $T_2$ to determine whether a lamp output has varied sufficiently from predetermined specification to require compensation.

2. The method of claim 1 wherein the scanning system incorporates a Raster Input Scanner (RIS) and wherein the lamp illuminates said document on a platen and reflected light from said document is focused onto a linear photosensor array.

3. The method of claim 2 wherein said diagnostic routine includes the steps of:
   providing samples of reflections of the lamp illumination output from a reference calibration strip along an optical path,
   focusing said reflected light samples onto the photosensor array,
   comparing the detected light level outputs from the photosensor array with a predetermined gray level response value, and
   recalibrating the photosensor gain if the photosensor response deviates from a predetermined percentage of a nominal gray level value so as to bring the response in within the predetermined percentage whereby the variations in lamp output which resulted in the out-of-calibration condition are compensated for.

4. The method of claims 1 or 2 wherein said illumination lamp is a fluorescent lamp.

5. The method of claim 2, further including the step of initiating a document scan mode at any time during said lamp energization or diagnostic routine steps.

6. The method of claim 1 wherein period of time $T_2$ is of relatively much shorter duration than said period of time $T_1$.

7. In an electrophotographic reproduction device wherein a document in an object plane is scanned in a copy mode by an optical assembly including at least a linear fluorescent lamp and a scanning mirror, a method for insuring that variations in a lamp output profile as measured at a linear photosensor array having a plurality of photosites are minimized including the steps of:
   detecting that the lamp has been in a standby state for a specified cumulative time period,
   applying power to the lamp following said detected cumulative time period to place the lamp is an active (on) state for time period shorter than the cumulative time period,
   activating a timing circuit at lamp turn on, the timing circuit generating a signal at the end of said shorter timing period which will initiate a diagnostic routine to determine whether the lamp variations require compensation and
   recalibrating the photosites of the photosensor array if compensation is required.

8. The method of claim 7 further including the step of enabling operation of the document copying mode during the shorter lamp on period or during the execution of said diagnostic routine.

9. The apparatus of claim 8 further including diagnostic control means for checking the lamp illumination profile following said warm up interval to determine whether variations in lamp profile require a recalibration.